Jan. 19, 1965  R. E. SCHOENEMAN  3,166,265
PERFORATED TAPE VACUUM BUFFER
Filed April 11, 1963
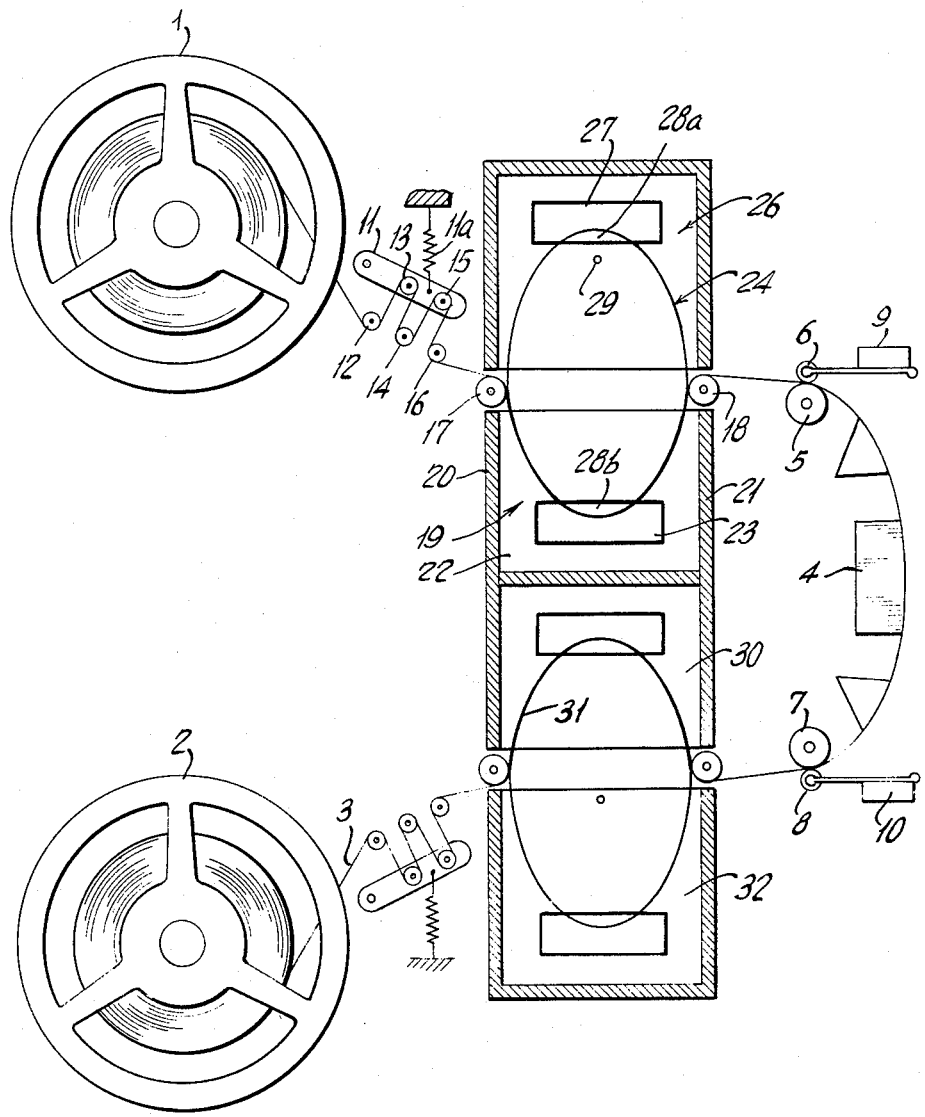
INVENTOR.
ROBERT E. SCHOENEMAN
BY
Douglas M. Clarkson
ATTORNEY

United States Patent Office 3,166,265
Patented Jan. 19, 1965

3,166,265
PERFORATED TAPE VACUUM BUFFER
Robert Edward Schoeneman, Roslyn Heights, N.Y.,
assignor to Potter Instrument Company, Inc., Plainview, N.Y., a corporation of New York
Filed Apr. 11, 1963, Ser. No. 272,476
6 Claims. (Cl. 242—55.12)

This invention, generally, relates to tape handlers and, more particularly, relates to a new and improved apparatus for maintaining desired tension on perforated tape by a vacuum control.

Often, perforated tape is used for the storage of information in computing system. In such uses, it is necessary to reach various positions along the length of the tape very quickly. This, in turn, requires frequent and rapid reversal of the direction of motion of the tape, and in present day equipment, start and stop time requirements are measured in fractions of a second. Simultaneous operation of every component in a tape handler is precluded due to inertia, and therefore, progressive control means is required.

In U.S. Patent 3,016,207, assigned to the same assignee as the present application, there is disclosed a Vacuum Loop Tape Handler for magnetic tapes subject to similar requirements of acceleration and deceleration. In this patent, there is disclosed a system of progressive control of tape tension which includes vacuum buffer loops as the first operating control and multiple loop tension arms as the second operating control. The tape is passed over vacuum chambers on each side of the read/write head, and a loop of tape is drawn into each chamber by the vacuum. Actually, the tape loop is developed by a differential pressure between the vacuum in the chamber to which one side of the tape is exposed and atmospheric pressure, to which the other side of the tape is exposed.

However, with perforated tape, it is impossible to obtain a pressure differential to maintain the desired tension in the tape loop due to the holes in the tape.

In U.S. Patent 2,862,675, there is disclosed the use of vertically disposed vacuum chambers having the respective open ends pointing upwardly. Cylindrical rings are positioned on the perforated tape to seal the perforations, enabling the build-up of the requisite differential pressure across the tape to provide the required tension. The edges of the ring are serrated to couple atmospheric pressure to the interior of the ring.

Because of the arrangement necessary with the system disclosed in U.S. Patent 2,862,675, a compactness of the loop chambers and the readout station cannot be maintained, and thus, longer tape lengths between tension-developing components are required with attendant loss of tensioning precision. Further, at ultra-high speeds, the inertial forces imposed by such rings have been found detrimental, since the rings rest on the tape.

Therefore, it is a primary object of this invention to provide an improved, compact tape handler having a progressive control arrangement for maintaining tension in a perforated tape, which control arrangement includes a vacuum-operated tape loop chamber as one component to control tape tension.

In accordance with this object, there is provided, in a preferred form of this invention, a tape handler apparatus with progressive tension control means which incorporates a pair of reels for receiving and paying out a perforated tape, a multiple loop tension arm to provide tension loops in the tape, and a vacuum chamber having a tape-receiving opening. A continuous flexible loop of imperforated tape is suspended opposite the tape-receiving opening so that one side of this loop is in position to seal perforations in a perforated tape to enable the vacuum chamber to develop a differential pressure across the perforated tape to form a loop extending into the vacuum chamber and to maintain tension on the perforated tape as it passes from one reel to the other. While other suspension devices may be used, the presently preferred form of the invention provides a second vacuum chamber opposite the tape-receiving opening of the first vacuum chamber to receive a portion of the imperforate tape thereby to suspend such imperforate loop in a substantially frictionless manner.

Having briefly described this invention, it will be described in greater detail along with other objects and advantages in the following detailed portions of the specification which may best be understood by reference to the single accompanying figure which is a partially sectioned elevation view, diagrammatic in form, of one embodiment of the present invention.

In the figure, there is shown tape reels 1 and 2 with a tape 3 passing therebetween. The tape 3 is conventional perforated tape in which the positional disposition of the perforations are representative of information stored thereon.

The tape 3 is guided past a transducer head 4 which, for example, senses the positional disposition of information-representing perforations for reading out the stored information. The head is positioned between capstan drive rollers 5 and 7 which are driven in opposite rotational directions, and pinch rollers 6 and 8 are positioned to pinch the tape depending upon the direction of tape motion that is desired. The actuating coil 9 moves the pinch roller 6 for one direction of tape motion, and the coil 10 moves the pinch roller 8 for the opposite direction.

At the same time, perforated tape storage reels 1 and 2 are rotated in the corresponding direction to feed perforated tape in one direction and take it up in the other. More particular details of the drives for the reels 1 and 2 are not shown as it will be understood that this invention applies equally for any suitable drive mechanism.

Tension arms are provided as the first means for keeping the tape under tension as the tape moves from one reel to the other. For example, tension arm 11, tensioned by spring 11a, developes tension in the perforated tape 3 as it passes over the idler rollers 12, 13, 14, 15 and 16.

As the tape passes additional idler rollers 17 and 18, located between the tension arm 11 and the capstan drive roller 5, it passes a tape-receiving opening in a vacuum chamber 19. The end walls 20 and 21 of the vacuum chamber 19 are positioned respectively beneath the idler rollers 17 and 18.

A side wall 22 and a matching side wall, not visible because of the cross sectional view, are separated by a distance substantially the same as the width of the perforated tape. Thus, the vacuum chamber is a rectangular, open-ended chamber, the narrow dimension of the open end being substantially equal to the tape width and, therefore, is adapted to receive the tape passed thereover in a loop extending into the chamber.

At the bottom of the vacuum chamber 19, there is provided a port 23 for coupling to a suitable vacuum source such as a blower (not shown for simplicity) to maintain the chamber under a predetermined vacuum.

To generate an effective differential pressure across the perforated tape 3, there is provided a continuous loop of imperforate tape 24 which engages the surface of the perforated tape 3 thereby sealing the perforations as the tape 3 passes through the vacuum chamber 19. The differential pressure between the atmosphere and the vacuum will draw the tape downwardly into a loop within the vacuum chamber 19 and will develop the desired tension in the tape.

To support the loop of imporforate tape 24 properly, there is provided an upper vacuum chamber 26 having a rectangular port 27 for connection with a suitable vacuum source. The chamber 26, like the chamber 19, is open-ended, having the open end facing and adjacent the open end of the chamber 19. Therefore, the continuous loop 24 is suspended by the action of the vacuum chambers 19 and 26 due to the differential pressure developed by the atmosphere upon the inside of the continuous loop 24 and the vacuum within the chambers 19 and 26.

The suspended loop of imperforate tape 24 may rotate freely, following the motion of the surface of the perforated tape 3. Because tape can be extremely light in weight, the system inertia is not increased substantially. Further, in this arrangement, the interior of the continuous, flexible loop 24 is always at atmospheric pressure and, since the loop 24 is the same width as the perforated tape 3 and since the loop 24 has a straight and uninterrupted edge, the development of a constant and predetermined tension on the perforated tape 3 is ensured.

Due to the imperforate tape loop 24 being suspended between the facing chambers 19 and 26 with a portion of the loop 24 entering each chamber, it will be recognized that the loop 24 is self-positioning due to the differential pressure between the inside and the outside surfaces. By having the portion of the loop 24 which enters the chamber 26 pass across the port 27, precise, automatic compensation and positioning is achieved.

For example, should the loop 3 of perforated tape drop lower into chamber 19, the imperforate loop 24 will follow, decreasing the area 28a of the port 27 that is open to the atmosphere and increasing correspondingly the area 28b of duct 23 that is open to the atmosphere. Thus, the differential pressures on the imperforate loop 24 will increase in the upward direction, as viewed in the drawing, and the imperforate loop 24, and consequently the tape 3 will return to a pre-established null position. By this means, tape positioning under normal operating conditions is ensured without complex positioning sensors and controls.

If the vacuum is lost or the apparatus is shut down, the loop in the perforated tape 3 will diminish until the tape passes substantially straight between rollers 17 and 18. The flexible loop 24 will rest upon the perforated tape 3 since the loop 24 is confined by the side walls of the chamber 26. When the perforated tape 3 is removed, a pin 29 prevents the loop 24 from crumpling to the bottom of the chamber 19.

For a tape handler apparatus that is to reverse the direction of tape travel, another vacuum loop-developing arrangement is positioned on the opposite side of the transducer head 4 from the chambers 19 and 26. A vacuum chamber 30 corresponds to the chamber 19 described above, except that the loop in the perforated tape 3 extends upwardly, as viewed in the drawing. Also, a vacuum chamber 32 corresponds to the chamber 26, and a flexible, continuous loop 31 corresponds to the loop 24, described above.

Thus, the vacuum buffer loops of perforated tape can be kept very close to the transducer head 4, and the arrangement of the reels, tension arms, transducer head, etc. is substantially more compact. Also, the inertia of the system is minimized. The suspension of the imperforate, flexible tape is virtually frictionless, and therefore, it can cling to the perforated tape, sealing the perforations without contributing adversely to the inertia of the system.

Therefore, when reversals in the direction of tape travel are produced, for example, by shifting the drive from the capstan roller 6 to the capstan roller 8, the vacuum buffer loops in the chambers 19 and 30 yield or take-up tape substantially instantaneously since the inertia of the tape in the vacuum buffer loop is extremely low. After the initial short interval of time, the tension arms start to operate to maintain tension, and still later, the driven reels 1 and 2 come into play.

This invention may be modified and embodied variously within the scope of the subjoined claims.

What is claimed is:

1. In a perforated tape handling system with progressive control means, the combination comprising,
   a pair of tape reels for receiving and for paying out tape,
   a transducer head,
   a multiple loop tension arm to provide tensioned tape loops between one of said reels and said head,
   tape driving means to drive tape in at least one direction between said reels,
   a first vacuum chamber on one side of said head including a tape-receiving opening
   a second vacuum chamber having a tape-receiving opening,
   the second vacuum chamber being positioned relative to said first vacuum chamber so that the tape-receiving opening of the second vacuum chamber is opposite the tape-receiving opening of the first vacuum chamber,
   a continuous loop of flexible, imperforate tape, and
   means to connect a source of vacuum to said first and second chambers to suspend said imperforate loop therebetween with said loop extending between and having a portion thereof entering each of said first and second chambers,
   whereby said loop is positioned for engaging a perforated tape to seal the perforations and permit a loop of perforated tape to be drawn into the first vacuum chamber.

2. The combination as set forth in claim 1 in which, said first and second vacuum chambers are respectively provided with an elongated port positioned in the side wall of each chamber,
   said means to connect a vacuum source includes the port through which said chamber is evacuated, and
   said port being positioned so that the portion of said loop entering each chamber extends across part of the respective port in said chamber.

3. The combination as set forth in claim 1 which includes,
   a third and fourth vacuum chamber,
   said third vacuum chamber being positioned substantially directly below said first vacuum chamber with bottom surfaces in abutting relationship so that a tape-receiving opening in the third vacuum chamber extends in the opposite direction from the tape-receiving opening in the first vacuum chamber,
   said fourth vacuum chamber having a tape-receiving opening positioned adjacent the tape-receiving opening of said third chamber,
   a second continuous loop of flexible, imperforate tape suspended between said third and fourth chambers,
   said second loop extending between said third and fourth chambers having a portion thereof entering each of said third and fourth chambers, and
   said portion entering said third chamber being positioned for engaging the surface of a perforated tape in perforation-sealing relationship.

4. The combination as set forth in claim 3 in which, said third and fourth chambers are respectively provided with ports in the side walls thereof for connection with a vacuum source, and
   said ports being located so that the portion of said loop entering each chamber extends across a part of the respective port in said chamber.

5. Apparatus for providing vacuum buffer loop control in a perforated tape transfer system, comprising,
   a first, second, third and fourth vacuum chambers,
   each of said chambers being a rectangular, open-ended chamber,
   the narrow dimension of said open end being a predetermined width substantially equal to the width of a perforated tape,
   each of said chambers being provided with an elongated vacuum port in the side wall, said first and second chambers being positioned with their bottom surfaces in abutting relationship and with the open ends thereof oppositely disposed, said third and fourth chambers being respectively positioned in proximate relationship to said first and second chambers with the open ends of said third and fourth chambers respectively facing the open ends of said first and second chambers, a first and second continuous loop of flexible, smooth-edged, imperforate tape having a width substantially equal to the width of said perforated tape, said first loop extending between said first and third chambers with a portion thereof entering and being suspended in such position by a differential pressure between the atmospheric pressure on the inside of said loop and the pressure in each of said first and third vacuum chambers, said second loop extending between said second and fourth chambers with a portion thereof extending into the chambers and being held in such position by a differential pressure between the atmospheric pressure on the inside of said loop and the pressure in each of said second and fourth vacuum chambers, and said perforated tape being passed through said first and second chambers under the portions of the loops extending therein.

6. Apparatus in accordance with claim 5 in which each of said loops extends sufficiently into each of said chambers associated therewith to overlap at least partially the vacuum ports therein.

No references cited.